June 5, 1923.
W. H. FOX
ICE CREAM CUTTING MACHINE
Filed Feb. 3, 1922
1,457,624
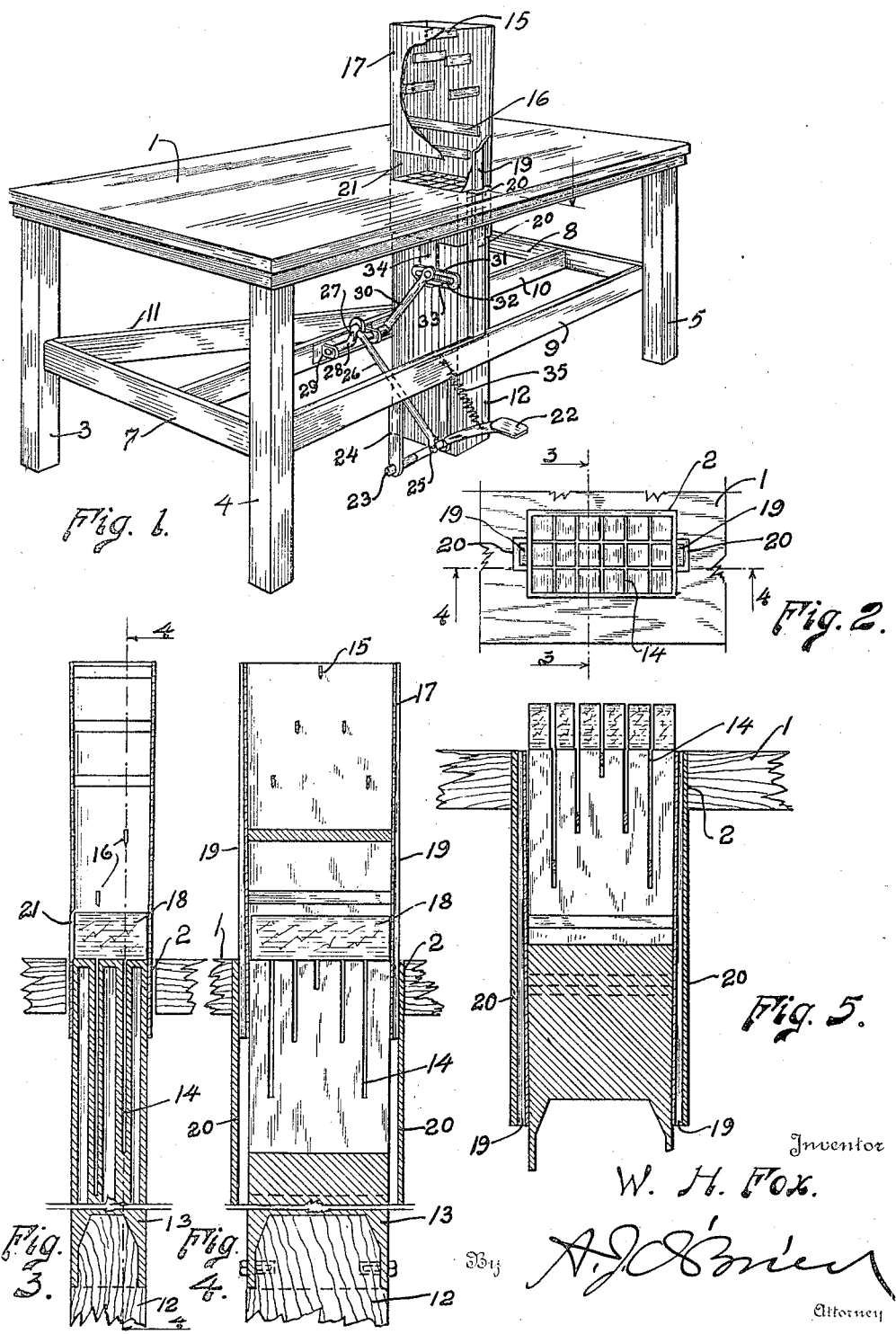

Patented June 5, 1923.

1,457,624

UNITED STATES PATENT OFFICE.

WILLIS HAYES FOX, OF DENVER, COLORADO, ASSIGNOR OF ONE-HALF TO THE C. G. CARLSON ICE CREAM COMPANY, OF DENVER, COLORADO, A CORPORATION OF COLORADO.

ICE-CREAM-CUTTING MACHINE.

Application filed February 3, 1922. Serial No. 533,835.

*To all whom it may concern:*

Be it known that I, WILLIS HAYES FOX, a citizen of the United States, residing at the city and county of Denver and State of Colorado, have invented certain new and useful Improvements in Ice-Cream-Cutting Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to cutting machines, and has reference to a machine that is designed especially for cutting ice cream, butter, and similar material into blocks or parallelepipedes of various sizes.

It has lately become quite common practice to vend ice cream in small parallelopidal blocks coated with chocolate and wrapped in fancy paper. This practice necessitates a lot of cutting as each ordinary brick of ice cream is cut into eighteen parallelepipedes, and this is usually done by hand, the cutter employing a large knife to make the cuts after having first marked the ice cream brick into the desired number of squares.

It is the object of this invention to provide a machine that will cut the ice cream brick into the required number of smaller parts at one operation, and to so design the apparatus that the cutting knives shall pass entirely through the ice cream brick and below the upper surface of the table so that the table surface will present a smooth and flat surface, which will enable the operator to readily remove the ice cream therefrom, after the cutting operation has been performed.

It is also my object to so design my machine that it will operate on long slabs of frozen ice cream of the proper width, and thickness, thus making it unnecessary to first cut these slabs into bricks of the proper size, as is now the case.

It is a further object of this invention to provide a machine that can be easily and thoroughly cleaned and sterilized, and in which the cutting knives shall be so arranged that all of the cuts will not be made simultaneously, but in which the outer set of knives will precede the inner ones in order that the cream will not have an opportunity to come into contact after it has been cut, as ice cream has the property of coalescing, and will firmly unite wherever a cut surface contacts with another.

It is a further object to provide a machine of the above described character which shall be of simple and rugged construction that can be constructed at a comparatively small cost, and which can be operated by one person.

In order to attain the above objects I employ a construction and arrangement of parts which I shall now describe in detail, and for this purpose I shall have reference to the accompanying drawing, in which—

Fig. 1 shows a perspective view of my cutter.

Fig. 2 is a top plan view of a portion of my cutter showing the cutters in their lowermost position.

Fig. 3 is a section taken on line 3—3 Fig. 2.

Fig. 4 is a section taken on line 4—4 Fig. 3 and

Fig. 5 is a section similar to that shown in Fig. 4, but showing the knives and cutting head in their lowermost position.

The same reference numerals will be used to indicate the same parts throughout the several views.

Numeral 1 represents the top of a table of usual construction into which my cutter is built so as to form a unitary structure therewith. In the table top 1, and near one side thereof, I cut a rectangular opening 2. Connecting the legs 3 and 4, and 5 and 6 (6 is not shown) are braces 7 and 8, and adjoining these are two parallel bars 9 and 10; diagonal braces 11 being provided from legs 3 and 6 to bar 10, secured to bars 9 and 10 is a support 12 which has a transverse section of the same size and shape as the ice cream brick which is to be cut. Secured to the upper end of the support 12 is a removable head 13, which is securely held in place on the top of support 12 by means such as shown in Figs. 3 and 4. Head 13 is of such length that its upper end surface is flush with the top of the table. This upper portion of head 13 is provided with a plurality of slots 14 of equal or of variable depth and adapted to receive the cutting knives 15 and 16 which are carried by the reciprocating cutter housing 17. The number of slots 14 depends upon the number of parts into which the brick 18 is to be cut. In the machine illustrated the brick is to be cut into eighteen (18) parts, and I, therefore, provide five (5) transverse knives 15 and two (2) longitudinal knives 16, each of which is so placed as to register with one of the slots 14, and enter therein when in its lowermost position. The cutter housing 17 is preferably made of metal and its lower end is of a size to fit snugly but slidingly the support 12, and removable head 13. In order to provide room for the brick to spread as it is cut, I make the housing 17 larger at the top than at the bottom, the total increase in width and length being substantially equal to the total thickness of the knives 16 and 15 respectively, although a smaller increase may be used if desired. In order to guide the housing 17 as it reciprocates I secure to the ends thereof guide strips which are upwardly tapering, in order that their outer sides may be parallel.

Cooperating with guides 19 are channels 20 which are secured at their upper ends to the top 1 and have their lower ends connected one to each of bars 9 and 10. By this means the housing 17 may freely reciprocate in a vertical direction. One side of housing 17 is provided with an opening 21 through which the brick 18 is introduced into the cutter casing. When the parts occupy the relative positions shown in Figs. 1, 3 and 4, the machine is ready to begin the cutting operation which is accomplished by moving the cutter housing downwardly until it reaches the position indicated in Fig. 5 and in this position the knives 15 and 16 will all have passed through the brick, and into the slots 14 and the upper edge of the housing 17 will be flush with the top of the table. It is apparent that when the parts occupy the position shown in Fig. 5 that the top of the table will be wholly unobstructed, and that the cut ice cream may be easily removed therefrom after which the parts are returned to the positions shown in Fig. 1. Since the upper edge of the opening 21 is thin, it can serve as a cutting edge, and this makes it possible to employ long slabs of ice cream instead of first having to cut the slabs into bricks.

For the purpose of reciprocating the cutter housing and knives, I have provided a mechanism illustrated in Fig. 1, which consists of a pedal 22 which is pivoted at 23 to a pair of downwardly extending brackets 24. To a point 25 on the pedal I connect a rod 26, whose upper end is pivotally connected with the offset portion 27 of rod 28, which is rotatably mounted in brackets 29, and has an arm 30 extending at right angles from one end thereof. The end arm 30 is connected by means of a pin 31 with a transverse slot 32 formed in a piece of metal 33, which is connected to the housing 17 by means of a strap 34. As the operator presses his foot down on pedal 22, he rotates the shaft 28 and moves the housing 17 downwardly to the position shown in Fig. 5. In order to return the parts to the position shown in Fig. 1, I provide a spring 35 or other equivalent means. The operating means just described is shown for illustration only, and can be replaced by any suitable means which will enable the operator to conveniently move the cutter.

I desire to call attention to the arrangement of the knives 15 and 16. As I have shown only two longitudinal knives 16, one is merely placed at a different level than the other, but where I employ several pairs or a number larger than two, as I do with respect to the transverse knives, I arrange the two end ones at the same level and the second pair at a distance above equal to the thickness of the material cut, etc. By this means I prevent the crowding of the material that would otherwise take place if the knives were all on the same level. I consider the arrangement of knives just described as of great importance in an ice cream cutter, as it prevents the portions from coalescing as they will if the cut edges are allowed to contact.

From the above it will appear that I have produced a simple machine of rugged and substantial construction, which is especially well adapted to be used for the cutting of ice cream bricks into a plurality of smaller parts, and which is so designed that the cutting members will all pass down below the top surface of the table, thus leaving the latter unobstructed and free for the operator to work on. All of the parts can be removed for cleaning and sterilizing, and the knives are so arranged that they will not crowd the material cut to any appreciable extent.

I am aware that various changes may be made in the specific construction without departing from the spirit of my invention, and I desire the machine shown and described to be considered as illustrative of the principles which are involved, as I do not desire to be limited to the exact structure shown any more than is made necessary by prior art.

Having now described my invention what I claim is

1. An ice cream cutting machine comprising, in combination, a support for the material to be cut, said support being provided with slots for the reception of cutting knives, a housing slidably connected with said support, a plurality of cutters carried by said housing and arranged to enter said slots, said knives being arranged at different distances from the top of said support, the housing having its sides diverging in an upward direction at a rate substantially equal to the rate at which the combined thickness of the knives increases.

2. A cutting machine comprising in combination a support for the material to be cut, said support being provided with slots for the reception of cutting knives, a housing slidably connected with said support; a plurality of cutters carried by said housing and adapted to enter said slots and means for reciprocating said housing, said cutters being arranged at different distances from the top of said support.

3. A cutting machine comprising in combination a support adapted to hold the material to be cut, said support being provided with a plurality of slots adapted to receive cutting knives, a housing slidably connected to said support; a plurality of staggered cutters attached to said housing and adapted to enter said slots when they are in their lowermost position; one side of said housing having an opening through which the material to be cut is introduced between the cutters and the support and means for reciprocating said housing.

4. A cutting machine comprising in combination a table an opening in the top thereof, a support secured to the table below the upper surface thereof, the upper end of said support being flush with the upper surface of the table, and provided with slots for the reception of cutters, a housing surrounding the support and adapted to reciprocate thereon, means for holding said housing in its uppermost position, an opening in one side of said housing whereby the material to be cut may be introduced thereinto when the housing occupies its uppermost position; a plurality of cutters carried by said housing and located above the upper edge of said opening, said cutters being adapted to enter the slots in the support, and means for reciprocating said housing, whereby the cutters may be made to pass through the material to be cut, and into said slots, the housing and cutters being so arranged that when they are in their lowermost position the upper parts thereof are below the top of the table, whereby the surfacing the latter is unobstructed.

5. A cutting machine comprising in combination a support having a plurality of slots adapted to receive cutting knives, a housing slidable thereon; a plurality of knives in said housing and adapted to enter said slots, said knives being spaced at different distances from the top of the support and means to reciprocate said housing.

6. A cutting machine comprising in combination a support for the material to be cut, said support being provided with slots for the reception of cutting knives, a housing slidably connected with said support, a plurality of cutters carried by said housing and adapted to enter said slots, and means for reciprocating said housing, said housing being upwardly divergent for the purpose of providing space for the material to spread as it is cut.

In testimony whereof I affix my signature.

WILLIS HAYES FOX.